United States Patent
Baier et al.

(10) Patent No.: US 7,486,750 B1
(45) Date of Patent: Feb. 3, 2009

(54) METHOD FOR OBTAINING INFORMATION REGARDING INTERFERENCE IN THE RECEIVER OF A MESSAGE TRANSMISSION SYSTEM

(75) Inventors: Paul Walter Baier, Kaiserlautern (DE); Martin Weckerle, Neustadt (DE); Martin Haardt, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 1499 days.

(21) Appl. No.: 09/889,518

(22) PCT Filed: Jan. 3, 2000

(86) PCT No.: PCT/DE00/00005

§ 371 (c)(1),
(2), (4) Date: Aug. 27, 2001

(87) PCT Pub. No.: WO00/44111

PCT Pub. Date: Jul. 27, 2000

(30) Foreign Application Priority Data

Jan. 19, 1999 (DE) .............................. 199 01 877

(51) Int. Cl.
*H04L 1/00* (2006.01)

(52) U.S. Cl. ..................................... 375/346

(58) Field of Classification Search ................ 375/146, 375/147, 148, 260, 271, 278, 284, 285, 302, 375/304, 315, 322, 325, 346, 348, 349, 350; 370/319, 320, 332, 333, 334, 335, 342, 441, 370/482, 483, 500; 455/10, 501, 63, 67.3, 455/110, 115, 134, 135
See application file for complete search history.

(56) References Cited

U.S. PATENT DOCUMENTS

| 5,796,788 | A | | 8/1998 | Bottomley | |
|---|---|---|---|---|---|
| 5,886,987 | A | * | 3/1999 | Yoshida et al. | 370/318 |
| 6,009,124 | A | * | 12/1999 | Smith et al. | 375/267 |
| 6,058,138 | A | * | 5/2000 | Fukumasa et al. | 375/130 |
| 6,144,711 | A | * | 11/2000 | Raleigh et al. | 375/346 |
| 6,240,149 | B1 | * | 5/2001 | Yukitomo et al. | 342/372 |
| 6,259,721 | B1 | * | 7/2001 | Uesugi et al. | 370/335 |
| 6,333,947 | B1 | * | 12/2001 | van Heeswyk et al. | 375/148 |

FOREIGN PATENT DOCUMENTS

WO          WO 98/32243          7/1998

OTHER PUBLICATIONS

Berstein et al., "Space-Time Processing for Increased Capacity of Wireless CDMA", IEEE, 597-601 (1996).
Bruner et al., "Adaptive Space-Frequency Rake Receivers for WCDMA", IEEE, 2383-86 (Mar. 1999).

(Continued)

*Primary Examiner*—Khanh C Tran
(74) *Attorney, Agent, or Firm*—Bell, Boyd & Lloyd LLP

(57) ABSTRACT

A system and device for wireless data transmission where information about interference in a message transmission system is obtained in a receiver.

19 Claims, 1 Drawing Sheet

OTHER PUBLICATIONS

Klein et al., "Linear Unbiased Data Estimation in Mobile Radio Systems Applying CDMA", IEEE, 11(7): 1058-66, (Sep. 1993).
Klein et al., "Equalizers for Multi-user . . . ", IEEE, 762-66, (1994).
Adachi et al., "Coherent Multicode DS-CDMA Mobile Radio Access", IEEE, E79(9): 1316-25 (Sep. 1996).

Adachi et al., "Wideband Multi-rate DS-CSMA for Next Generation Mobile Communications Systems", IEEE, 57-62 (1997).
Schmalenberger et al., "Multi Antenna C/I Balancing in the Downlink of Digital Cellular Mobile Radio Systems".

* cited by examiner

METHOD FOR OBTAINING INFORMATION REGARDING INTERFERENCE IN THE RECEIVER OF A MESSAGE TRANSMISSION SYSTEM

CLAIM FOR PRIORITY

This application claims priority to International Application No. PCT/DC00/00005 which was published in the German language on Jan. 3, 2000.

TECHNICAL FIELD OF THE INVENTION

The invention relates to a method and a device for wireless data transmission, and in particular, to wireless data transmission where information about interference in a message transmission system is obtained in the receiver.

BACKGROUND OF THE INVENTION

In message or data transmission, it is desirable to obtain as uncorrupted a transmission of the user signals as possible, to suppress interference which exists at the same time and in the same frequency band in addition to the wanted signal, and thermal noise, as well as possible in the receivers. To be able to selectively take measures against interference, it is required to know as much as possible about the characteristics of the interference. Apart from the intensity of the interference, such characteristics are, for example, its spectrum, its correlation properties and the direction of incidence of the interfering signals at the receiver.

In many cases such as, for example, in permanently installed radio transmission links, potential interfering influences by other permanently installed transmitters, which do not emit any user signals from the point of view of the transmission link under consideration, are known. According to the prior art, such interfering influences can be suppressed by simple measures such as directional transmission and reception, a procedure normally used in microwave radio. In many cases, especially in the multi-subscriber systems of mobile communication, such information on the properties of the interference is not known. Accordingly, countermeasures adapted to the interference cannot be easily taken. Assuming interference-limited multi-subscriber systems in which, therefore, the interference is essentially caused by other users of one's own system, the time correlation of the interfering signals is equal to the time correlation of the wanted signals and is thus known as long as interfering signals which are incident from different directions are uncorrelated. Knowledge of the time correlation of the interfering signals can be utilized in the receiver for improving the transmission quality by decorrelating the interference.

TD-CDMA as disclosed in A. Klein, P. W. Baier: Linear unibiased data estimation in mobile radio systems applying CDMA. IEEE Journal on Selected Areas in Communications, Vol. 11, 1993, p. 1058 to 1066, as an example for third-generation mobile radio systems, uses the hybrid FDMA/TDMA/CDMA (frequency/time/code division multiple access) method. The time correlation of the interfering signals can be taken into consideration in the data detection. An example in which no information about the correlation properties of the interference are utilized is the WCDMA (wideband CDMA) disclosed in F. Adachi, K. Ohno, A. Higashi, T. Dohi, Y. Okumura: Coherent multicode DS-CDMA mobile radio access DS-CDMA mobile radio system, IEICE Transactions on Communications, Vol. E79-B, No. 9, 1996, p. 1316 to 1324 and F. Adachi, M. Sawahashi: Wideband multi-rate DS-CDMA for next generation mobile communications systems. Proc. IEEE Wireless Communications Conference (WCC '97), Boulder, 1997, p. 57 to 62, air interface concept which is also proposed for third-generation mobile radio systems and which is based on the hybrid FDMA/CDMA multiple access method.

The disadvantageous factor in the transmission methods corresponding to the prior art, is that they do not obtain information on the received interference (or only to a very limited extent). Hence, they do not use such information to a desirable degree for improving the transmission quality. For example, no directional information at all is obtained with respect to the interference. If multiple-antenna receivers are used, directional patterns could be generated. For example, when using array antennas, which selectively have less gain for those directions from which strong interfering signals arrive at the receiver, the ratio between useful power and interference power at the receiver end is maximized. However, this would require knowledge of the directions of interference which cannot be obtained in the systems according to the prior art.

The system described above of the time correlations of the interference, for example in the case of TD-CDMA, are not about obtaining information about the interference. Rather, using knowledge about the interference is questionable, especially in mobile communication, since the instantaneous characteristics of the interference can greatly deviate from those assumed due to the permanent changing in time of the spatial constellation of the mobile stations which, as a rule, is not predictable.

The prerequisite of uncorrelated interference signals arriving at the receiver from different directions, which has been addressed above, is also not generally met. If the signal of an interference source propagates toward the receiver along a number of paths with different delay, and/or if the interfering signals coming from one interference source have different directions of incidence at the location of the receiver, the aggregate interference signal produced by superposition of the interference signals at the receiving location have different time correlations than the individual interference signals. Thus, they also have different time correlations from those of the user signal which have been assumed.

SUMMARY OF THE INVENTION

In one embodiment of the invention, there is a method for the wireless data transmission using at least one transmitter and at least one receiver, the receiver having one or more receiving antenna. The method includes, for example, utilizing information on received interference signals to improve the quality of transmission of the data transmission, obtaining quantitative information about received user signals from the received signals of one of the antennas by using a first signal processing algorithm, and obtaining quantitative information about the received interference signals from the received signals of one of the antennas and the quantitative information obtained about the received user signals by using a second signal processing algorithm wherein the quantitative information about the received interference signals is used to generate a directional pattern at the transmitter.

In one aspect of the invention, the first signal processing algorithm provides an estimate of the transmitted user data.

In another aspect of the invention, the first signal processing algorithm provides an estimate of the characteristics of the radio channels operating between the transmitters and the receiver.

In still another aspect of the invention, the second signal processing algorithm includes algorithms to reconstruct the user signals received from the receiving antennas by the quantitative information obtained about the signals.

In yet another aspect of the invention, the second signal processing algorithm includes a weighted or unweighted subtraction of the reconstructed received user signals from the total received signals.

In another aspect of the invention, the second signal processing algorithm includes a forming of the spatial covariance matrix of the received interference signals.

In yet another aspect of the invention, the second signal processing algorithm includes a forming of the temporal covariance functions of the received interference signals at each of the antennas.

In still another aspect of the invention, the second signal processing algorithm includes a forming of the total covariance functions of the received interference signals.

In another aspect of the invention, the second signal processing algorithm includes an estimating of the spatial, temporal and/or total covariance functions by finite temporal averaging over the received interference signals.

In still another aspect of the invention, the second signal processing algorithm includes an estimating of the directions of incidence of the interference.

In yet another aspect of the invention, the second signal processing algorithm includes an estimating of the power and/or the spectral shape of the interference.

In another aspect of the invention, the first signal processing algorithm includes a forming of the spatial covariance matrix of the received user signals.

In yet another aspect of the invention, the first signal processing algorithm is based on the principle of a single user detection in the case of data transmission.

In another aspect of the invention, the first signal processing algorithm is based on a principle of multi-user detection in the case of data transmission.

In still another aspect of the invention, the first signal processing algorithm is based on a principle of a rake receiver in the case of data transmission.

In yet another aspect of the invention, the first signal processing algorithm includes forward error correction decoding at the receiver end during data transmission.

In still another aspect of the invention, the first signal processing algorithm is based on a principle of the zero-forcing algorithm.

In yet another aspect of the invention, the first signal processing algorithm is based on a principle of maximum-likelihood estimation or minimum mean square error estimation.

In one embodiment of the invention, there is a system for wireless data transmission. The system includes, for example, a receiver having one or more receiving antennas utilizing information on received interference signals to improve the quality of transmission of the data transmission, wherein quantitative information is obtained about received user signals from the received signals of one of the antennas by using a first signal processing algorithm, and the quantitative information about the received interference signals is obtained from the received signals of one of the antennas and the quantitative information obtained about the received user signals by using a second signal processing algorithm wherein the quantitative information about the received interference signals is used for generating a directional pattern at the transmitter; and a transmitter to generate a directional pattern based on the quantitative information about the received interference signals.

DETAILED DESCRIPTION OF THE INVENTION

Figure 1:
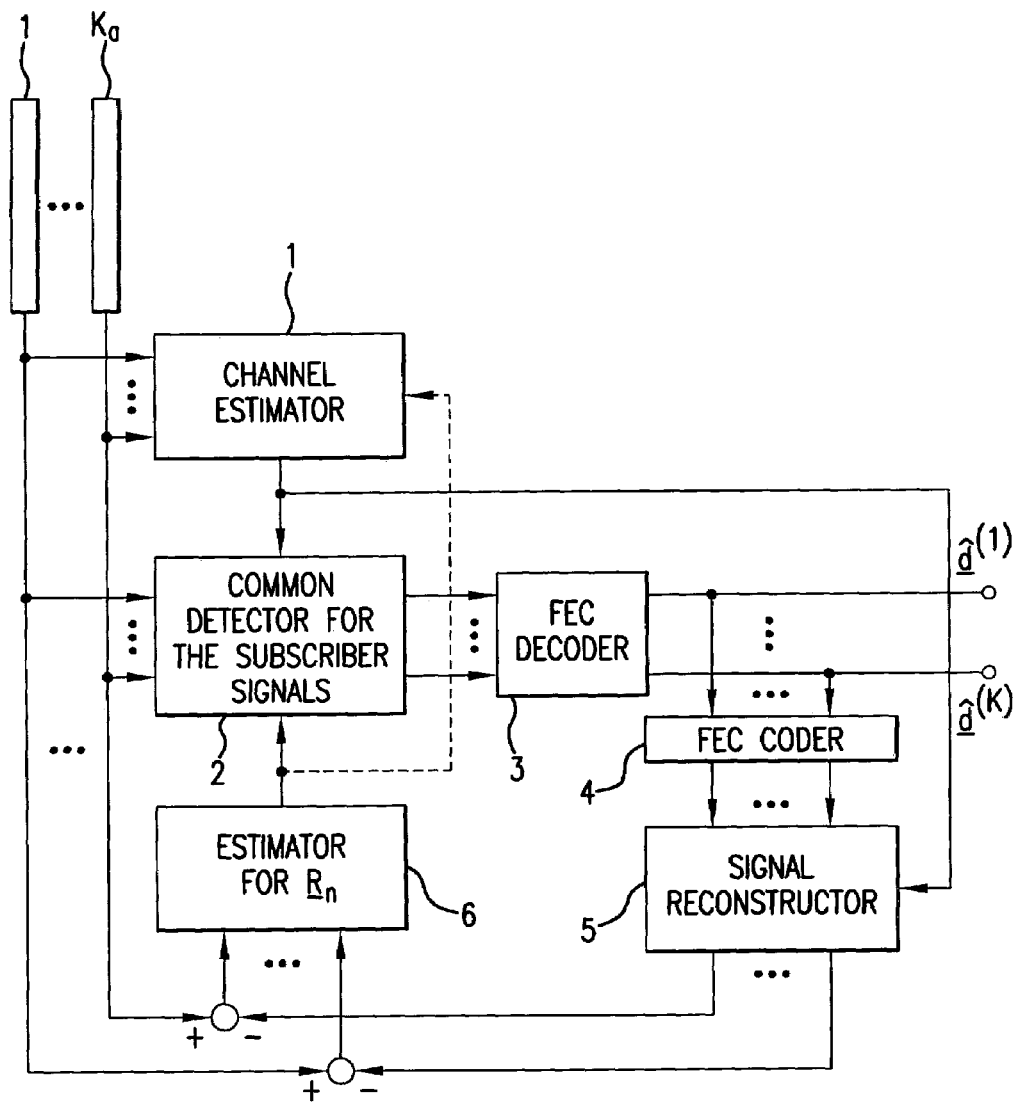
FIG. 1 illustrates an exemplary receiving system in the present invention.

In one method of the invention, Ka receiving antennas are assumed. In this method, information on the user signal is first obtained from the received signals of the antennas. From the total received signals which contain both the user signal(s) and the interference signal(s), and the information, previously obtained about the user signal(s), information about the interference signal(s) can then be obtained.

In one aspect of the invention, the information about the interference signals is obtained, for example, by an approximate reconstruction of the received user signals and by subsequent subtraction of the reconstructed user signals from the total of the received signals. This embodiment thus provides an estimate of the time functions $\hat{n}^{(ka)}(t)$, ka=1 . . . Ka of the interference at the Ka receiving antennas.

In another aspect of the invention, the estimates $\hat{n}^{(ka)}(t)$ determined as above, the estimates $$\hat{R}_n^{(l,m)}(\tau)=E\{\hat{n}^{(l)}(t)\cdot\hat{n}^{(l)}(t+\tau)\}\ l,m=1 \ldots Ka \tag{1}$$

of the temporal covariance functions of the interference signals effective at the antennas can be obtained. In addition, the normalized spatial covariance matrix $$\hat{R}_s = \frac{1}{\sigma^2}\begin{pmatrix} E\{\hat{n}^{(1)}(t)\cdot\hat{n}^{(1)}*(t)\} & E\{\hat{n}^{(1)}(t)\cdot\hat{n}^{(Ka)}*(t)\} \\ E\{\hat{n}^{(2)}(t)\cdot\hat{n}^{(1)}*(t)\} & E\{\hat{n}^{(2)}(t)\cdot\hat{n}^{(Ka)}*(t)\} \\ E\{\hat{n}^{(Ka)}(t)\cdot\hat{n}^{(1)}*(t)\} & E\{\hat{n}^{(Ka)}(t)\cdot\hat{n}^{(Ka)}*(t)\} \end{pmatrix} \tag{2}$$

of dimension Ka×Ka can be determined for the Ka receiving antennas, taking into consideration the interference power $\sigma^2$, which can also be determined from the estimated interference signals. In the case of both the data transmission and digital signal processing at the receiving end, discrete-time samples are available as signals which can be subdivided into finite blocks due to their burst structure. If the subscriber signals are detected burst by burst, it is sufficient to determine information about the interference burst by burst. Accordingly, the interference signals at the individual antennas, estimated in accordance with the embodiments of the method according to one aspect of the invention, can be represented as vectors $$\hat{\underline{n}}^{(ka)}=(\hat{n}_1, \hat{n}_2 \ldots \hat{n}_{WB})^T, ka=1 \ldots Ka \tag{3}$$

where $\hat{n}_i$, i=1 . . . WB, are the WB samples of the interference signal over one burst, since these interference signals are time-discrete and limited in time. The embodiment of the method according to one aspect thus leads to finite, discrete-time covariance functions.

Instead of forming the expected value when determining the covariance functions, which requires infinite averaging over the estimated samples of the interference, the temporal averaging is preferably finite in real systems. It is performed over a previously defined number Z of bursts. In the case of a mobile radio system, Z depends on the rate of change of the constellation of mobile stations. If the constellation of mobile stations changes greatly from burst to burst, Z must be selected to be equal to one. If not, Z can be greater than 1. If the Z vectors according to (3) at the Ka antennas according to $$\underline{\hat{N}}_t^{(ka)} = (\underline{\hat{n}}_1^{Ka}, \underline{\hat{n}}_2^{Ka} \ldots \underline{\hat{n}}_Z^{Ka})^T, ka=1 \ldots Ka \qquad (4)$$

are ordered into in each case WB×Z matrices, estimates $$\hat{R}_n^{(l,m)} = \frac{1}{Z} \cdot \underline{\hat{N}}_t^{(l)} \cdot \underline{\hat{N}}_t^{(m)+T}, l, m = 1\ldots Ka \qquad (5)$$

of the temporal covariance matrices can be formed in derivation of (1). The following then holds for the estimate of the total covariance matrices:

$$\hat{R}_n = \begin{pmatrix} \hat{R}_n^{(1,1)} & \hat{R}_n^{(1,2)} & \ldots & \hat{R}_n^{(1,Ka)} \\ \hat{R}_n^{(2,1)} & \hat{R}_n^{(2,2)} & \ldots & \hat{R}_n^{(2,Ka)} \\ \hat{R}_n^{(Ka,1)} & \hat{R}_n^{(Ka,2)} & \ldots & \hat{R}_n^{(Ka,Ka)} \end{pmatrix} \qquad (6)$$

The actual interference vectors $\underline{n}^{(ka)}(t)$, ka=1 ... Ka, at the Ka antennas can be correlated with the estimated interference vectors $\underline{\hat{n}}^{(ka)}(t)$, ka=1 ... Ka, according to (3) and combined in a total interference vector $$\underline{n}^{(ka)} = (\underline{n}^{(1)T}, \underline{n}^{(2)T} \ldots \underline{n}^{(Ka)T})^T \qquad (7)$$

The actual total covariance matrix of the interference is as obtained as $$R_n = E\{\underline{nn}^{*T}\} \qquad (8)$$

Assuming uncorrelated interference signals arriving at the receiving site from various directions, the actual total covariance matrix $R_n$ according to (8) can be split into a spatial covariance matrix $R_s$ and a temporal covariance matrix $R_t$ which is equal for all received signals at the Ka receiving antennas, so that the following holds true:

$$R_n = R_s \otimes R_t. \qquad (9)$$

If it is only intended to obtain an estimate $\hat{R}_s$ of the spatial covariance matrix, the Ka×Z WB matrix is used as a basis $$\underline{\hat{N}}_s = \begin{pmatrix} \underline{\hat{n}}_1^{(1)T} & \underline{\hat{n}}_2^{(1)T} & \ldots & \underline{\hat{n}}_Z^{(1)T} \\ \ldots & \ldots & \ldots & \ldots \\ \underline{\hat{n}}_1^{(Ka)T} & \underline{\hat{n}}_2^{(Ka)T} & \ldots & \underline{\hat{n}}_Z^{(Ka)T} \end{pmatrix} \qquad (10)$$

and the required estimate $\hat{R}_s$ is determined according to $$\hat{R}_s = \frac{1}{Z \cdot WB} \cdot \underline{\hat{N}}_s \cdot \underline{\hat{N}}_s^{*T} \qquad (11)$$

An important advantage, which can be achieved with the method according to the invention, lies in that, instead of possibly faulty information about the interference to be expected, the information about the interference is obtained from the actual received signal and is thus continuously updated. A further advantage lies in the possibility of obtaining information both on the spatial correlation characteristics of the interference and on the temporal correlation characteristics of the interference.

This information can be used either directly to suppress interference when estimating the user signals from the received signals. Alternatively, information about the directions of incidence of the interference at the receiver can be obtained from the information about the spatial correlation characteristics of the interference, depending on the signal processing algorithm. In the case of multi-antenna receivers, the information about the directions of incidence of the interference at the receiver or, respectively, about the spatial correlation characteristics of the interference can be used for generating directional patterns. The patterns, of which selectively have less gain in those directions from which strong interference signals arrive at the receiver, cause the ratio between useful power and interference power at the receiver end to be maximized.

The previous considerations relate to the receiver end. In duplex systems, each receiver is paired with a transmitter. If multi-antenna systems are used for receiving and transmitting, the information about the received interference (obtained in accordance with the method explained above) can be used for advantageously driving the antennas in the transmitting case. The basic idea of this is that sending one's own signals into the directions from which strong interference signals are incident tends to produce strong interference in other receivers. When a number of antennas is used, therefore, the knowledge of the main directions of interference at the receiver end can be generally used, independently of the transmission system considered, to radiate as little power of the transmitted signal as possible in the directions of the main interference source and thus to reduce interference seen throughout the system.

As an exemplary embodiment, one possible implementation of the method according to the invention for obtaining information with respect to the interference is presented with reference to the discrete-time model of the uplink of a TD-CDMA mobile radio system in the text which follows. Moreover, it is shown here how the information obtained can be used for improving the quality of transmission. Use in other transmission systems is also included in the scope of the invention.

The corresponding receiving system is shown in FIG. 1. It is assumed that K mobile subscribers are simultaneously transmitting in the same frequency band and time slot and the subscriber signals are separated by subscriber-specific CDMA codes.

The transmitted bursts include two data blocks and a midamble arranged between them which provides for the channel estimate at the receiver end. In the text which follows, the first data block of a burst will be considered in the description of the data detection. A corresponding observation would apply to the second data block. According to R. Schmalenberger, J. J. Blanz: Multi antenna C/I balancing in the downlink of digital cellular mobile radio systems. Proc. IEEE Vehicular Technology Conference (VTC '97), Phoenix, 1997, p. 607 to 611, a system matrix A can be set up which includes both the K*Ka channel impulse responses of the K subscribers to the Ka receiving antennas and the type of signal generation at the transmitter end. Together with the total data vector d, which includes the data blocks of the K subscribers, and a total interference vector n, the total received-signal vector e $$e = Ad + n \qquad (12)$$

is obtained. e includes samples of the received signals at all Ka antennas which are based on the first data block of a transmitted burst. Firstly, a channel estimator 1 forms a channel estimate and a common detector 2 performs joint detection of the subscriber signals R. Schmalenberger, J. J. Blanz: Multi antenna C/I balancing in the downlink of digital cellular mobile radio systems. Proc. IEEE Vehicular Technology Conference (VTC '97), Phoenix, 1997, p. 607 to 611, by the generally disturbed received signals e. In TD-CDMA systems, algorithms which can include the knowledge of the entire covariance matrix according to (8) are used for the joint data estimate of subscribers.

One example of such algorithms is the zero-forcing algorithm. In one- or multi-antenna receivers in systems according to the prior art, it is assumed that the temporal covariance matrix $R_t$ can be determined directly from the spectral shape of the transmitted signals. In the text which follows, this covariance matrix is designated by $R_t$. This matrix $R_t$ is taken into consideration in the data detection, even though the actual temporal correlations of the interference signals at the receiving site may deviate from the assumed temporal correlations due to multi-path propagation of the interference from an interference source.

In the case of multi-antenna receivers in systems according to the prior art, the spatial correlations of the interference are not taken into consideration in the detection of the data and/or in the channel estimate, i.e. the covariance matrix $R_s$ is replaced by the Ka×Ka unity matrix $I^{(Ka)}$. Thus, there is no optimum data detection in the sense of the zero-forcing algorithm in systems according to the prior art. The method according to the invention can be used for improving the data estimate and the channel estimate by prior estimating of the covariance matrix $R_n$ of the interference due to the estimating of the received interference at each antenna, as shown in FIG. 1.

To estimate the interference, a conventional data detection is first performed for a number of received bursts, using the matrix $$\underline{R}_n = I^{(Ka)} \otimes \underline{\hat{R}}_t \quad (13)$$

for the covariance matrix $R_n$ according to (8), using the matrix $\underline{R}_t$. This provides an estimate $$\underline{\hat{d}} = (\underline{\hat{A}}^{*T} \underline{R}_n^{-1} \underline{\hat{A}})^{-1} \underline{\hat{A}}^{*T} \underline{R}_n^{-1} \underline{e} \quad (14)$$

of the transmitted data which can be used for the approximate reconstruction of the received signal based on the user signals $$\underline{\hat{e}}_d = \underline{\hat{A}} \cdot \underline{\hat{d}} \quad (15)$$

by the system matrix $\underline{\hat{A}}$ which includes the information about the estimated K*Ka channel impulse responses. The reconstruction $\hat{e}_d$ is performed in a signal reconstructor 5. Units 3 and 4 (FEC decoder and FEC coder) can be arranged between units 2 and 5. Unit 3 performs FEC decoding at the receiver end for the case in which FEC coding is taken into consideration in the signal processing at the transmitter end. In unit 4, a corresponding FEC coding of the estimated data takes place to obtain correct signal reconstruction. Subtracting the reconstructed received signal $\hat{e}_d$ according to (15) from the actual received signal e according to (12) makes it possible to determine an estimate $$\underline{\hat{n}} = \underline{e} \cdot \underline{\hat{e}}_d \quad (16)$$

for the total interference factor n according to (7). From the estimates of the interference signals at the individual antennas, which were thus obtained, both the spatial correlation characteristics of the interference, see (11), and the temporal correlation characteristics of the interference, see (5), and thus the covariance matrix $\underline{\hat{R}}_n$ of the interference according to (6) can be estimated in an estimating unit 6.

Taking into consideration the estimated covariance matrix, the signals received at the individual antennas can be subjected both to an improved channel estimate, if such a one is required, and to an improved data estimate $R_n$ according to (13) being replaced by $\underline{\hat{R}}_n$.

The procedure described up to here can be iteratively continued. Assuming that the interference scenario, and thus also the correlation characteristics of the interference, do not or do not significantly change during the provided period of estimating the matrix and in the subsequent period which is provided for estimating new data, the estimated covariance matrix $\underline{\hat{R}}_n$ can be used for estimating new data in order to achieve an improvement in the data estimate.

What is claimed is:

1. A method for the wireless data transmission using at least one transmitter and at least one receiver, the receiver having one or more receiving antennas comprising:
    utilizing information on received interference signals to improve the quality of transmission of the data transmission;
    obtaining a quantitative information about received user signals from the received signals of one of the antennas by using a first signal processing algorithm; and
    obtaining quantitative information about the received interference signals from the received signals of one of the antennas and the quantitative information obtained about the received user signals by using a second signal processing algorithm wherein the quantitative information about the received interference signals is used to generate a directional pattern for transmission at the receiver.

2. The method as claimed in claim 1, wherein the first signal processing algorithm provides an estimate of the transmitted user data.

3. The method as claimed in claim 1, wherein the first signal processing algorithm provides an estimate of the characteristics of the radio channels operating between the transmitters and the receiver.

4. The method as claimed in claim 1, wherein the second signal processing algorithm includes algorithms to reconstruct the user signals received from the receiving antennas by the quantitative information obtained about the signals.

5. The method as claimed in claim 1, wherein the second signal processing algorithm includes a weighted or unweighted subtraction of the reconstructed received user signals from the total received signals.

6. The method as claimed in claim 1, wherein the second signal processing algorithm includes a forming of the spatial covariance matrix of the received interference signals.

7. The method as claimed in claim 1, wherein the second signal processing algorithm includes a forming of the temporal covariance functions of the received interference signals at each of the antennas.

8. The method as claimed in claim 1, wherein the second signal processing algorithm includes a forming of the total covariance functions of the received interference signals.

9. The method as claimed in claim 1, wherein the second signal processing algorithm includes an estimating of the spatial, temporal and/or total covariance functions by finite temporal averaging over the received interference signals.

10. The method as claimed in claim 1, wherein the second signal processing algorithm includes an estimating of the directions of incidence of the interference.

11. The method as claimed in claim 1, wherein the second signal processing algorithm includes an estimating of the power and/or the spectral shape of the interference.

12. The method as claimed in claim 1, wherein the first signal processing algorithm includes a forming of the spatial covariance matrix of the received user signals.

13. The method as claimed in claim 1, wherein the first signal processing algorithm is based on the principle of a single user detection in the case of data transmission.

14. The method as claimed in claim 1, wherein the first signal processing algorithm is based on a principle of multi-user detection in the case of data transmission.

15. The method as claimed in claim 1, wherein the first signal processing algorithm is based on a principle of a rake receiver in the case of data transmission.

16. The method as claimed in claim 1, wherein the first signal processing algorithm includes forward error correction decoding at the receiver end during data transmission.

17. The method as claimed in claim 1, wherein the first signal processing algorithm is based on a principle of the zero-forcing algorithm.

18. The method as claimed in claim 1, wherein the first signal processing algorithm is based on a principle of maximum-likelihood estimation or minimum mean square error estimation.

19. A system for wireless data transmission, comprising:

a receiver having one or more receiving antenna utilizing information on received interference signals to improve the quality of transmission of the data transmission, wherein quantitative information is obtained about received user signals from the received signals of one of the antennas by using a first signal processing algorithm, and the quantitative information about the received interference signals is obtained from the received signals of one of the antennas and the quantitative information obtained about the received user signals by using a second signal processing algorithm wherein the quantitative information about the received interference signals is used for generating a directional pattern at the transmitter; and a transmitter to generate a directional pattern based on the quantitative information about the received interference signals.

* * * * *